Dec. 8, 1942.  E. F. HENNEFER  2,304,358
ALARM APPARATUS
Filed Aug. 20, 1942

INVENTOR
Edwin F. Hennefer
BY
*Reed A. Stout*
ATTORNEY

Patented Dec. 8, 1942

2,304,358

UNITED STATES PATENT OFFICE 2,304,358

ALARM APPARATUS

Edwin Franklin Hennefer, Salt Lake City, Utah, assignor to Salt Lake Stamp Company, Salt Lake City, Utah, a corporation of Utah Application August 20, 1942, Serial No. 455,440

3 Claims. (Cl. 116—67)

This invention relates to an alarm apparatus of a type designed to frighten birds and animals, and it concerns, more particularly, an alarm apparatus of that type adapted to provide an explosion at predetermined intervals.

Various devices are known to the art which provide periodic explosions and are used to frighten birds and animals away from fields and orchards, fish hatcheries, and away from livestock. One of the most successful of such devices contains an explosion tank having a conduit leading from its upper portion to a lamp where a pilot flame is kept burning. A steady inflow of a combustible gas fills the tank to the level of the conduit; thereupon the overflow of gas passes through the conduit into the lamp. Ignition of the gas in the lamp takes place and the flame travels back through the conduit and causes the desired explosion to take place in the explosion tank, the expanding gases being allowed to escape through a suitable trap-door. This cycle is continually repeated, gas accumulating in the explosion tank after each explosion and again overflowing into the lamp to provide periodic explosions.

In the operation of this device, the gas required both for the explosion and to provide fuel for the lamp may be generated in a compartment having an upper portion filled with water and a lower portion containing a suitable substance which reacts with water to provide a combustible gas. This substance is preferably calcium carbide, which reacts with water to form acetylene gas. Water in the upper portion is caused to drip upon the calcium carbide, and the acetylene gas thereby generated is transmitted part to the explosion tank and part to the pilot flame.

While self-contained alarm devices of this type are generally satisfactory, they have the disadvantage that there is no effective means in these devices for varying the lapse of time between explosions. The ways which have been considered for regulating the period between explosions usually have employed mechanical timing devices or valve mechanisms to control the rate of gas flow into the explosion tank or from the explosion tank into the lamp. These mechanisms, however, hold back the natural flow of gas and may cause an excessive gas pressure to be built up within the carbide compartment or within the explosion tank. Another way which has been suggested to control the period between explosions is to regulate the rate at which the gas is formed in the carbide compartment. It has been proposed to do this by controlling the amount of water that drips onto the carbide. This method, however, is not successful since the rate of gas generation appears to remain substantially constant despite variations in the rate at which water drips onto the carbide.

An object of my invention is to provide an improved automatic alarm apparatus. More particularly, an object of the invention is to provide a means by which the period between explosions in an automatic alarm apparatus may be controlled. A specific object of the invention is to provide an automatic alarm apparatus having a device by which the amount of time between explosions may be regulated and which neither interferes with the rate of gas formation nor holds back the rate of gas flow in such a way as to build up an excessive gas pressure within the apparatus. Other objects will appear in the following description of the invention.

My invention may be illustrated diagrammatically by reference to the accompanying drawing, in which Fig. 1 is a side view in section of an automatic exploding alarm device;

Figure 1:
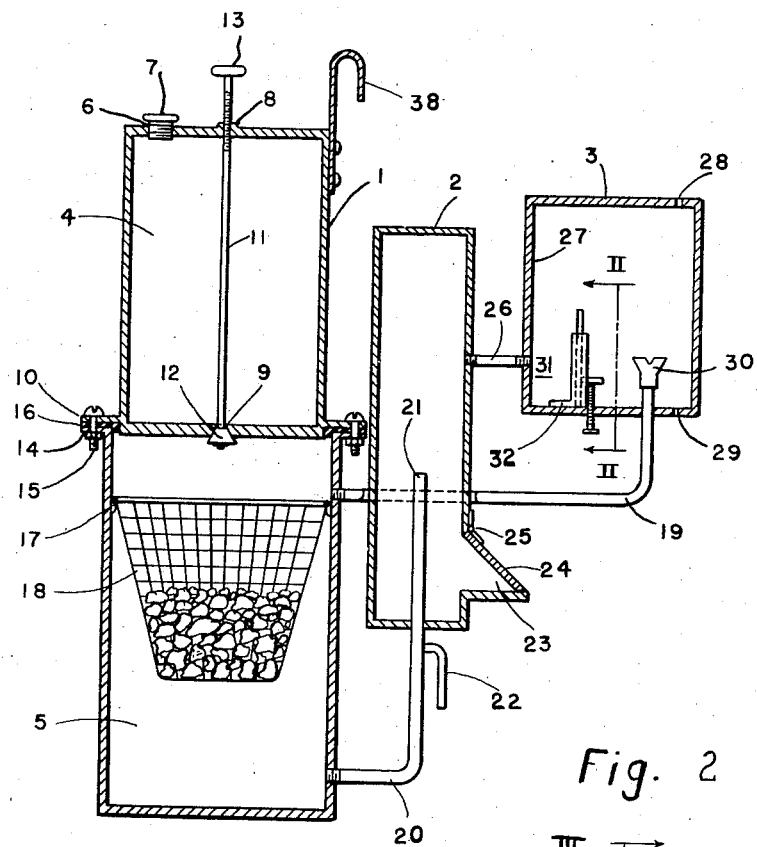

As is shown in Fig. 1, a preferred embodiment of my invention may comprise a gas generating compartment 1, an explosion tank 2, and a lamp 3.

The gas generating compartment 1 is divided into two portions, one being the upper water container 4 and the other being the lower carbide container 5.

The upper water container 4, which in operation is kept filled with water, is provided in its top with a threaded opening 6 through which water may be poured into the container and which may be capped by closure 7. Also formed in the top of the water container is a threaded aperture 8, and an aperture 9 is provided in the bottom. The apertures 8 and 9 are in vertical alignment. An annular flange 10 is disposed around the outside of the container.

An elongated rod or valve stem 11 is in screw-threaded engagement within the threaded aperture 8 and extends into aperture 9. The lower end of the valve stem 11 carries a conical plug 12, and the wall of the aperture 9 is preferably tapered to form a seating surface for the plug. By turning the valve stem 11, the plug 12 may be raised or lowered within the aperture 9 to vary the rate at which water passes out of the container through the aperture 9. Wing member 13 is provided to facilitate turning of the valve stem 11 and the adjustment of the valve plug.

The carbide container 5 is provided with an annular flange 14 which matches the flange 10 of the water container, and attaching bolts 15 extend through the matched flanges to hold the water container and the carbide container in tight unitary relationship. A gasket 16 may be disposed between the water and the carbide containers to provide a gas-tight seal.

Supported within the carbide container by suitable means, such as upon the annular shoulder 17 provided in the side wall of the container, is a basket 18 adapted to be filled with calcium carbide. Leading out of the carbide container is a passageway or conduit 19 which communicates with the lamp 3 and a passageway 20 which communicates with explosion tank 2.

The discharge tank 2 is adapted to be filled with gas from the generating compartment 1, the gas being carried to the tank through passageway 20 and discharged within the tank from a nozzle 21. The passageway 20 is provided with an air intake 22 through which air is drawn to provide an explosive air-gas mixture. Suitably disposed, preferably in the lower side wall of the tank 2, is a discharge orifice 23 normally closed by a trap 24 mounted by a hinge 25 to the side wall of the tank. In the upper portion of the tank, a conduit 26 permits gas passage from the explosion tank to the lamp 3.

The lamp 3 comprises a frame or casing 27 having a vent 28 in the top and vent 29 in the bottom walls thereof. The side walls of the casing may be cut away and provided with glass panes for the passage of light therethrough, if desired. The passageway 19 extends into the lamp and terminates in a burner 30 where a pilot flame is kept burning, the combustion gas from which escapes through the top vent 28 while air for supporting combustion enters through the bottom vent 29.

Figure 3:
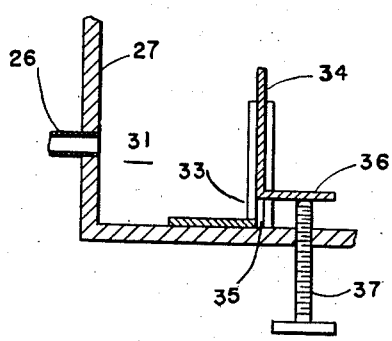
Fig. 3 is a view taken along lines III—III of Fig. 2.
Figure 2:
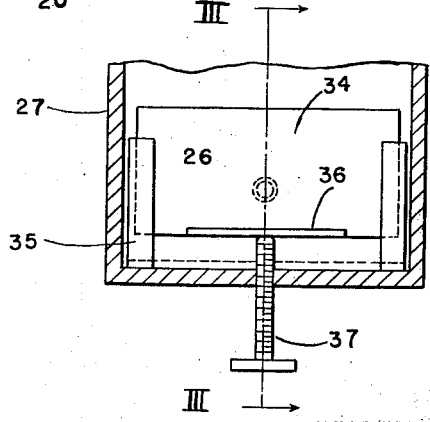
Fig. 2 is a view taken along lines II—II of Fig. 1.

Forming a partition in the lamp between the conduit 26 and the burner 30 and providing a gas accumulating space 31 adjacent to the opening of the conduit 26 is a baffle 32. This baffle, as is shown in Figs. 2 and 3, preferably consists of two members, a supporting plate or bracket 33 and an extension 34. The plate 33 is an angle member having one leg mounted on the floor of the lamp. The other leg is upright and is folded along its sides to provide grooves or slots 35 and its upper edge is disposed at a distance from the roof of the lamp. The extension 34 is in confronting bearing relationship against the upright leg of plate 33 and held tracked in that relationship for vertical sliding movement by the grooves 35. An outwardly turned lug or flange 36 is provided on the lower edge of the extension member 34, and this lug is operatively engaged by a vertical screw 37 which passes through the floor of the lamp in screw threaded engagement therewith. Rotation of the screw 37 is adapted to raise or lower the extension member 34 so as to adjust the height of the partition provided by the baffle 32 and to control thereby the volume of the gas accumulating in space 31.

The gas generating compartment, the explosion tank, and the lamp may be welded together or otherwise suitably held in assembled relationship to provide a unitary structure. The structure is provided with a suitable means, such as a hook 38, whereby it may be hung on a branch of a tree or mounted on a suitable support. Preferably a coil spring, not shown, is provided for engagement at one end with the hook 38 and the other end of the spring is attached to the support so that the structure may be yieldably suspended from the support.

In operating the apparatus, the water container 4 is filled with water and the valve plug 12 is adjusted so that water drips into the carbide container 5 at a rate sufficient to maintain a steady generation of acetylene gas. A portion of the gas passes through the passageway 19 to the lamp 3 where it supplies fuel to the burner for the pilot flame. The rest of the gas passes from the gas generator through the passageway 20 into the explosion tank 2, air also being introduced into the explosion tank through intake 22 to provide an explosive air-gas mixture. When enough gas accumulates within the explosion tank to reach the level of the conduit 26, the overflow of gas passes into the lamp 3. There the gas rises behind the baffle 32 until the space 31 is filled, and then overflows into contact with the pilot flame at the burner 30, causing its ignition. The flame is discharged through the conduit 26 to effect ignition of the charge of gas within the gas filled explosion tank 2, whereby an explosion takes place, the explosion being accompanied by a loud report sufficient to frighten birds and animals away from the vicinity. The trap 24 is forced open by the pressure of the expanding gases to release the pressure and prevent injury to the walls of the tank 2. The trap then falls shut, and gas again begins to accumulate within the tank 2 to provide for the next explosion.

The baffle serves several purposes in the operation of the apparatus. It holds or collects the gas entering the lamp and delays its impingement against the pilot flame until enough gas accumulates in space 31 that the ignition of the gas upon contact with the pilot flame, instead of resulting in a steady burning as the gas flows out of the conduit, provides a flash within the space. The flame of this flash travels back through the conduit and sets off the explosion in the tank 2 as heretofore described. The baffle also serves to shield the burner and to prevent the pilot flame from being blown out by the force of the flash within the space 31.

The baffle serves the further purpose of providing an effective way by which the amount of time between explosions may be controlled. The adjustment of the baffle by means of the screw to raise the extension member 34 enlarges the volume of the space 31, and the volume is reduced by the counter adjustment of the screw to lower the extension member. By varying the volume of the space 31, the time required before the space behind the baffle becomes filled with gas and the gas passes over the top of the baffle and into contact with the pilot flame may be changed, more time being required when the extension member is raised and the volume of space 31 increased than when the extension member is lowered to provide a smaller volume behind the baffle. For example, in actual tests with an apparatus similar to that illustrated in the accompanying drawings, an average time of one minute was found to be consumed between explosions with the baffle at its normal height of a quarter of an inch above the floor of the lamp. When the extension was raised to give the baffle a height of a half inch above the floor of the lamp, however, the period of time between explosions was increased to two and a half minutes; and at a height of three quarters of an inch above the floor the elapsed period was three and a half minutes. In these tests, the rate of gas flow from the carbide generator was substantially the same.

Various modifications may be made in the invention as illustrated in the above description. For example, instead of making the baffle vertically adjustable to vary the space behind the baffle, the baffle may be adapted for movement toward and away from the burner. In this way, just as by vertical adjustment of the baffle, the volume of the space behind the baffle may be varied, and the period required for the space to become filled with gas and for the gas to become ignited, may be controlled. Devices other than the screw illustrated also may be used to provide adjustment to the baffle. It will be appreciated, too, that if a gas be used which is lighter than air, the baffle may be disposed from the top instead of from the bottom of the lamp. These and other modifications that will occur to those skilled in the art, it will be understood, are within the contemplation of my invention as set forth in the following claims.

I claim:

1. An alarm apparatus for producing an explosive report at predetermined intervals, comprising an explosion tank adapted to be filled with an explosive gas, a lamp, a conduit leading from said explosion tank and opening in said lamp, said conduit being adapted to permit passage of an overflow of gas from said explosion tank to said lamp, a burner disposed in said lamp, a baffle in said lamp forming a space adjacent the opening of said conduit and separating said space from said burner to delay impingement of the gas issuing from said conduit against said burner until the gas fills said space, and means for moving said baffle to vary the volume of said space, whereby the time required for the gas to fill said space and to impinge against said burner and the resulting ignition of the gas may be varied.

2. An alarm apparatus for producing an explosive report at predetermined intervals, comprising an explosion tank adapted to be filled with an explosive gas, a lamp, a conduit leading from said explosion tank and opening in said lamp, said conduit being adapted to permit passage of an overflow of gas from said explosion tank to said lamp, a burner disposed in said lamp, a baffle in said lamp forming a space adjacent the opening of said conduit and separating said space from said burner to delay impingement of the gas issuing from said conduit against said burner until the gas fills said space, said baffle comprising an upright mounted on the floor of the lamp and having its upper edge at a distance from the roof of said lamp and an extension slidably disposed against one face of the upright for vertical movement to extend the height of said baffle above the floor of the lamp to change the cubic area of said space, and means for moving said extension vertically to vary the volume of said space, whereby the time required for the gas to fill said space and to impinge against said burner and the resulting ignition of the gas may be varied.

3. A self contained alarm apparatus for producing an explosive report at predetermined intervals, comprising a gas generating means, an explosion tank adapted to be filled with an explosive gas, a lamp, a burner disposed in said lamp, means for carrying gas from said gas generating means to said explosion tank and to said burner, a conduit leading from said explosion tank and having an opening in said lamp, said conduit being adapted to permit passage of an overflow of gas from said explosion tank to said lamp, a baffle extending substantially across the lamp and forming a space adjacent the opening of said conduit and separating said space from said burner to delay impingement of the gas issuing from said conduit against said burner until the gas fills said space, and means for moving said baffle to vary the volume of said space, whereby the time required for the gas to fill said space and to impinge against said burner and the resulting ignition of the gas may be varied.

EDWIN FRANKLIN HENNEFER.